United States Patent [19]

Fortnagel et al.

[11] Patent Number: 5,105,781
[45] Date of Patent: Apr. 21, 1992

[54] AIR-COMPRESSING INTERNAL COMBUSTION ENGINE WITH SELF-IGNITION, WITH A MAIN COMBUSTION SPACE AND AN INSERT ADJOINING THE LATTER, ACCOMMODATED IN THE CYLINDER HEAD AND HAVING AN ANTECHAMBER

[75] Inventors: Manfred Fortnagel, Korb; Gerhard Jaeger, Weissach i. Tal; Volker Heiderich, Stuttgart; Hans-Georg Schmidt, Nürtingen-Hardt, all of Fed. Rep. of Germany

[73] Assignee: Mercedes-Benz AG, Fed. Rep. of Germany

[21] Appl. No.: 734,766

[22] Filed: Jul. 23, 1991

[30] Foreign Application Priority Data

Aug. 14, 1990 [DE] Fed. Rep. of Germany ....... 4025665

[51] Int. Cl.⁵ .............................................. F02B 19/14
[52] U.S. Cl. ...................................... 123/280; 123/293
[58] Field of Search ............... 123/255, 261, 262, 275, 123/280, 293

[56] References Cited

U.S. PATENT DOCUMENTS

| | | | |
|---|---|---|---|
| 2,787,258 | 4/1957 | Schümann | 123/280 |
| 3,970,053 | 7/1976 | Goodacre | 123/280 |
| 4,046,111 | 9/1977 | Nagano | 123/280 X |
| 4,186,692 | 2/1980 | Kawamura et al. | 123/280 X |
| 4,193,379 | 3/1980 | Dietrich et al. | 123/280 X |
| 4,218,992 | 8/1980 | Latsch et al. | 123/280 X |
| 4,224,902 | 9/1980 | Binder et al. | 123/280 |

FOREIGN PATENT DOCUMENTS

| | | |
|---|---|---|
| 1112856 | 8/1961 | Fed. Rep. of Germany ...... 123/280 |
| 2624189 | 12/1977 | Fed. Rep. of Germany . |
| 2725344 | 12/1978 | Fed. Rep. of Germany . |
| 2753266 | 5/1979 | Fed. Rep. of Germany . |
| 2840367 | 3/1980 | Fed. Rep. of Germany . |
| 3127585 | 1/1983 | Fed. Rep. of Germany . |
| 3152898 | 12/1983 | Fed. Rep. of Germany . |
| 3503578 | 3/1986 | Fed. Rep. of Germany . |
| 3703800 | 11/1988 | Fed. Rep. of Germany . |
| 3807838 | 4/1989 | Fed. Rep. of Germany . |
| 0097016 | 6/1982 | Japan ................................. 123/280 |
| 0784481 | 10/1957 | United Kingdom ................ 123/280 |

OTHER PUBLICATIONS

ATZ Automobilzetschroft 91, pp. 212, 213, Apr. 1989.
Technische Rundschau 25/90 p. 37, Jul. 26, 1990.

Primary Examiner—Willis R. Wolfe
Attorney, Agent, or Firm—Evenson, Wands, Edwards, Lenahan & McKeown

[57] ABSTRACT

An air-compressing internal combustion engine with oblique injection into an antechamber having a sphere-like combustion space and conduit of arranged offset relative to one another. A spheroid impact head with a cup shaped recess on the underside thereof facing the conduit is provided in the lower half of the combustion space. A glow plug is arranged in the downward current of the air flow downstream of the injection nozzle in the antechamber.

20 Claims, 3 Drawing Sheets

AIR-COMPRESSING INTERNAL COMBUSTION ENGINE WITH SELF-IGNITION, WITH A MAIN COMBUSTION SPACE AND AN INSERT ADJOINING THE LATTER, ACCOMMODATED IN THE CYLINDER HEAD AND HAVING AN ANTECHAMBER

BACKGROUND AND SUMMARY OF THE INVENTION

The invention relates to an air-compressing self igniting internal combustion engine, with a main combustion space and an insert adjoining the latter, accommodated in the cylinder head and having an antechamber which comprises a sphere-like combustion space and a conduit.

An insert provided for air-compressing internal combustion engines and featuring an antechamber and oblique injection is disclosed in "Technischer Rundschau", 25/90 page 37. In that device, the insert has, in the combustion space, in the region of the mouth of the conduit, an insertion pin with a spherical impact head, the underside of which is set obliquely to produce a moderate air turbulence. The glow plug protruding into the combustion space of the antechamber is arranged in the downward current, that is, downstream of the injection nozzle. Approximately half of the injection spray strikes the upper side of the impact head.

A high standard has already been achieved with such measures on the insert as regards fuel consumption, exhaust-gas and noise behavior.

It is the underlying object of the invention to reduce further the pollutant content in the exhaust gas by special measures on the antechamber side.

This and other objects and advantages are achieved according to the invention by the eccentricity of the conduit relative to the sphere-like combustion space and the special arrangement of the insertion pin with a pronounced positional offset relative to the conduit, which results in a substantially larger main inflow cross-section and a correspondingly smaller inflow cross-section of the air, and thus in more intensive mixing of the air with the fuel. This arrangement also reduces considerably the content of carbon monoxides and hydrocarbons and of particles in the engine exhaust gas, and meets all engine-specific requirements, e.g. with respect to naturally aspirated or supercharged engines and large- and small-volume engines.

Other objects, advantages and novel features of the present invention will become apparent from the following detailed description of the invention when considered in conjunction with the accompanying drawings.

DETAILED DESCRIPTION OF THE INVENTION

Figure 1:
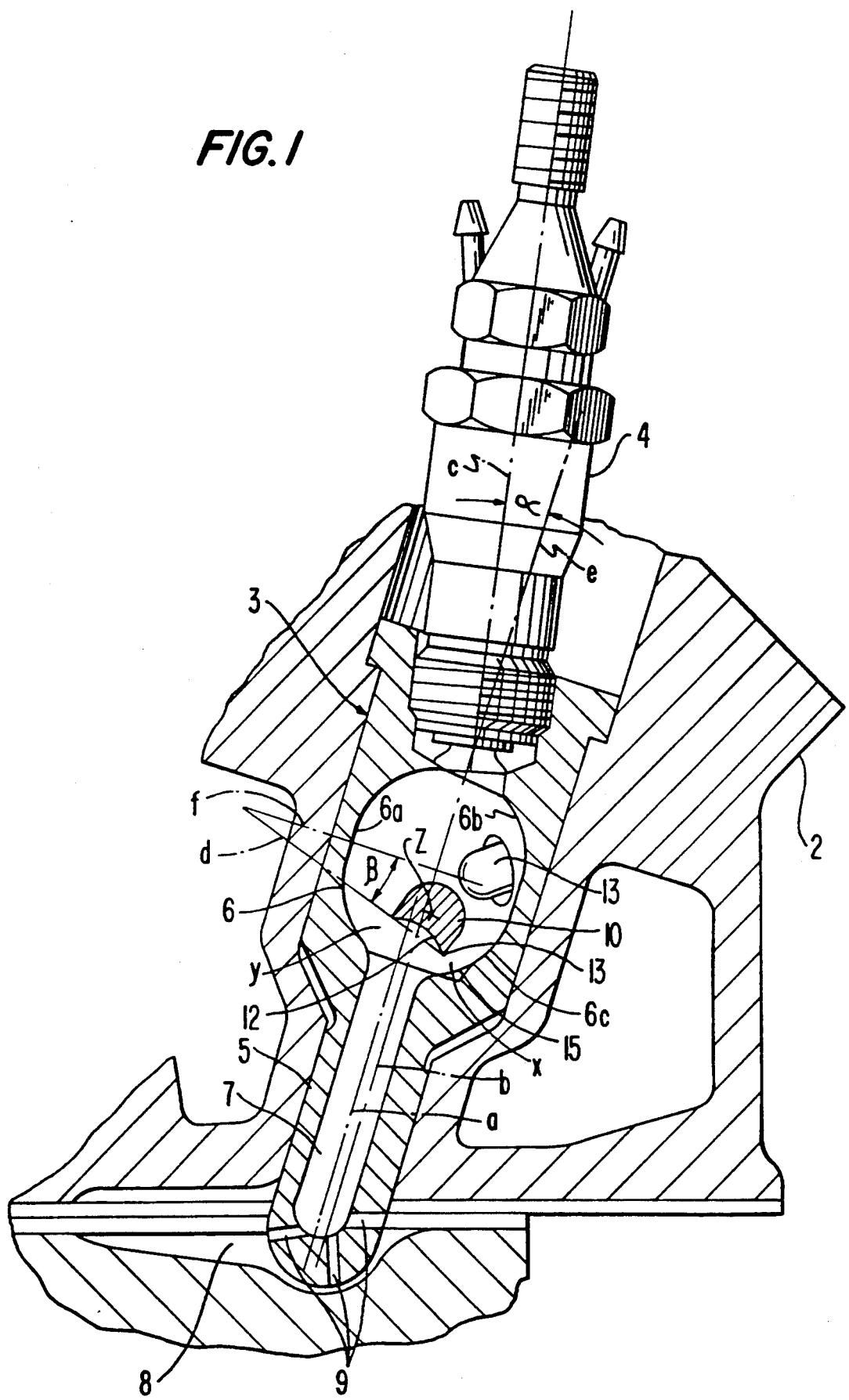
FIG. 1 is a cross-section of an internal combustion engine with the insert in the cylinder head and having an injection nozzle.

FIG. 1 shows a partial cut-out of an air-compressing internal combustion engine I with an insert 3, inserted obliquely in the cylinder head 2, and an injection nozzle 4. The insert 3 with its centrally adjoining insert neck 5 contains an antechamber which comprises a sphere-like combustion space 6 and a conduit 7 which is arranged eccentrically in the insert neck 5 and connects the combustion space 6 with the main combustion space 8 of the internal combustion engine 1 via burner openings 9 arranged in a star shape. The elongate combustion space 6 is formed by a cylindrical portion 6a and hemispheres 6b, 6c adjoining on both sides.

The longitudinal axis a of the conduit 7 is offset relative to the longitudinal axis b of the insert 3 by a distance of 0.25 to 1.25 mm and the longitudinal axis c of the injection nozzle 4 is arranged obliquely to the longitudinal axis b of the insert 3, the angle $\alpha$ of obliquity corresponding to about 5°. The latter can be between 2° and 10°. The injection nozzle 4 is situated opposite the conduit 7 in such a way that the fuel spray which it discharges is directed obliquely into the combustion space 6 in the direction of a spherical impact head 10, which is the centrally situated part of an insertion pin 11 arranged offset in the combustion space 6 in a region facing away from the mouth of the conduit 7 (FIGS. 2-5) and, on its underside, has a cup-shaped recess 12, the plane d of which (as defined by the rim) is arranged obliquely by an angle $\beta$ of about 25° towards the conduit 7 relative to a center plane f extending transversely to the center plane e of the insert 3.

The eccentric arrangement of the insertion pin 11 and of the conduit 7 gives rise, on the one hand, to a secondary inflow cross-section x and, on the other hand, to a main inflow cross-section y, with a cross-section ratio of between 0.55 and 0.8. The impact head 10 is provided on its cup-shaped underside with a bell mouth 10a, by which the inflowing air is additionally swirled.

Figure 2:
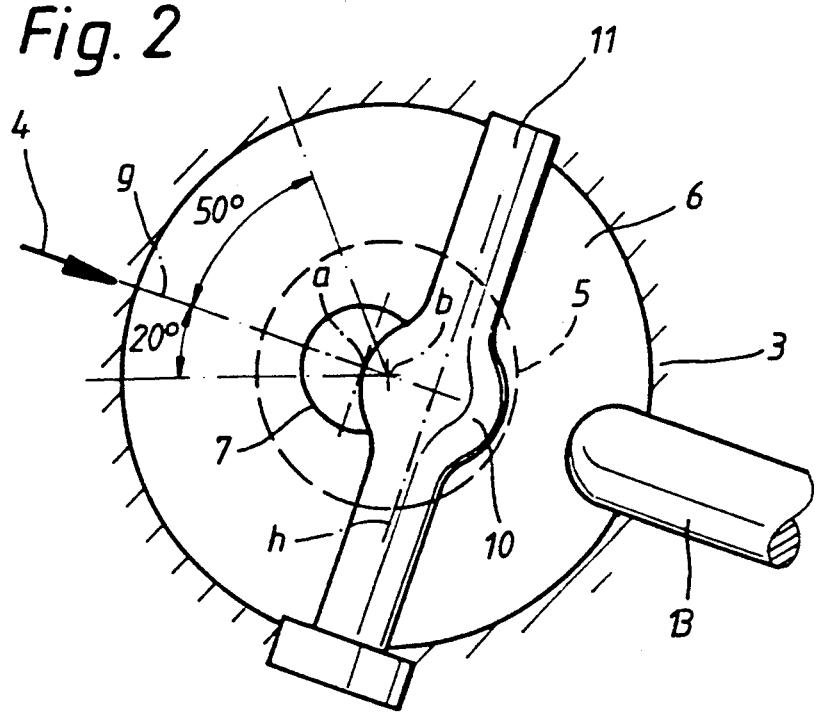
FIGS. 2-5 depict the combustion space of the antechamber—viewed from above—showing various positions of the conduit and insertion pin and various arrangements of the glow plug and or the injection nozzle, indicated by an arrow.

Protruding into the combustion space 6 is a glow plug 13, the longitudinal axis of which lies in the plane g defined by the longitudinal axes a, b of insert 3 and conduit 7 (FIG. 2). The glow plug 13 is arranged on the side of combustion space 6, opposite the injection nozzle 4 and the conduit 7, to be precise in the upper half of the combustion space 6. The obliquely discharged fuel spray passes close by the glow pencil of the glow plug 13 and in part strikes that half of the upper side of the impact head 10 which is on the glow-plug side and in part strikes a niche 15 lying at the bottom of the combustion space 6.

FIG. 2 shows an illustrative embodiment in which the injection nozzle 4 and the glow plug 13 lie in the plane g extending through the longitudinal axes a, b of insert 3 and conduit 7 and in which the longitudinal axis h of the insertion pin 11 provided with the spherical impact head 10 lies at a right angle to this plane g. The longitudinal axis of the injection nozzle 4 can be rotated by a maximum of 50° in the clockwise direction or by a maximum of 20° in the anticlockwise direction about the longitudinal axis b of the insert 3.

Figure 3:
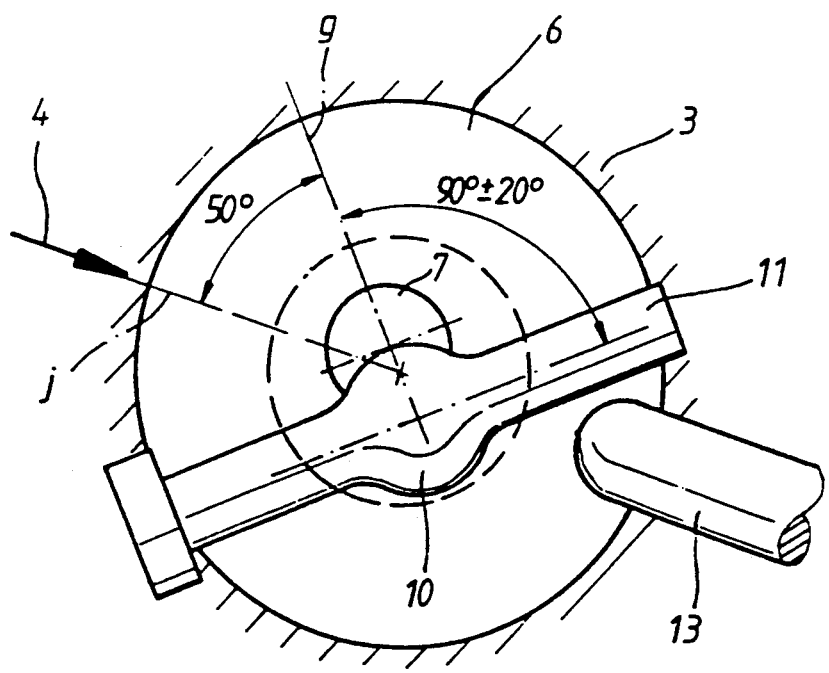

FIG. 3 shows another illustrative embodiment in which the eccentrically situated conduit 7 is arranged in a position rotated by 50° in the clockwise direction relative to that in FIG. 2 about the longitudinal axis b of the insert 3, as in the position of the insertion pin 11.

Figure 4:
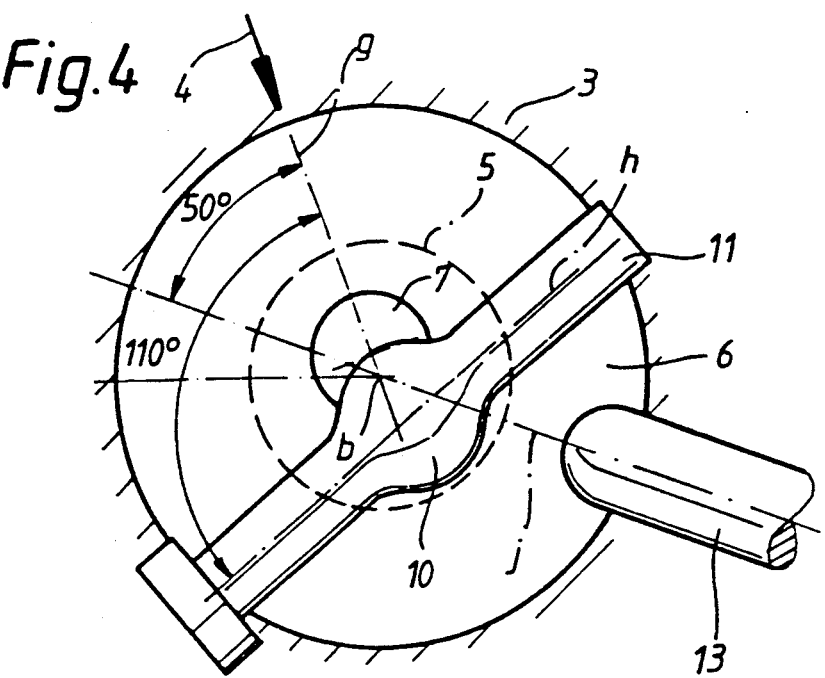
Figure 5:
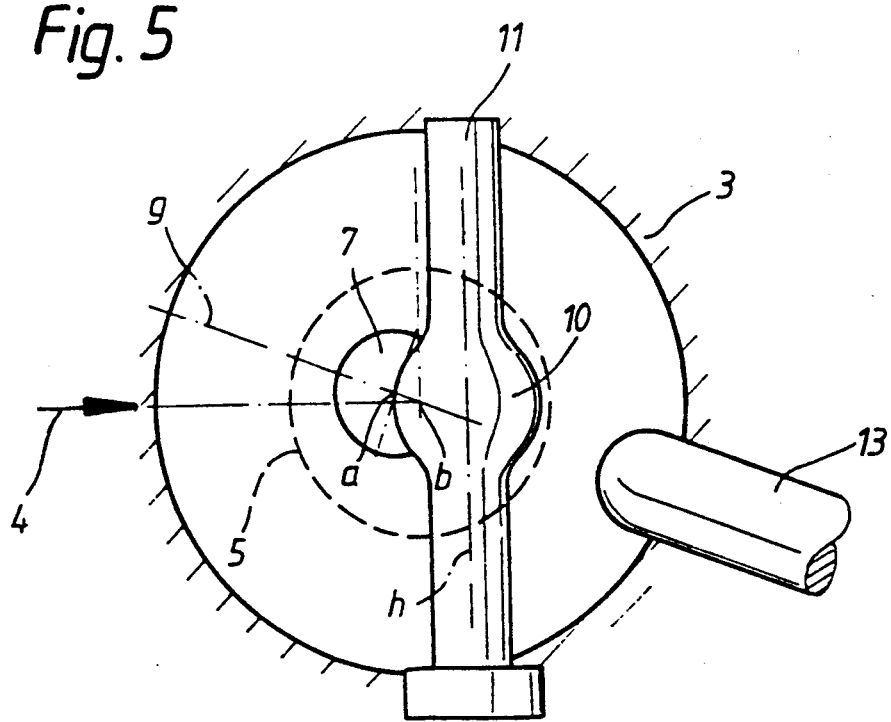

FIG. 4 shows an illustrative embodiment which differs from the illustrative embodiment in accordance with FIG. 2 in that the injection nozzle 4 and the conduit 7 are both arranged in a position rotated by 50° in the clockwise direction about the longitudinal axis b of the insert 3, the longitudinal axis of the insertion pin 11 being situated in a position rotated by 110° in the anticlockwise direction from the plane g, about the longitudinal axis b of the insert 3. FIG. 5 shows an illustrative embodiment in which the injection nozzle 4 is arranged in a position rotated by 20° in the anticlockwise direction relative to that in accordance with FIG. 2, as is the insertion pin 11.

If required, the glow plug 13 can be arranged in a position rotated slightly in the clockwise or anticlockwise direction out of a basic position, about the longitudinal axis b of the insert 3.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Air-compressing self igniting internal combustion engine arrangement comprising,
   a main combustion space;
   an insert adjoining the main combustion space, said insert being accommodated in a cylinder head of said engine and having an antechamber, which comprises a sphere-like combustion space, and a conduit in an insert neck centrally adjoining the insert;
   a fuel injection nozzle communicating with said antechamber;
   an insertion pin arranged in a lower half of the combustion space, dividing the inflow of air into a main inflow and a secondary inflow, said insertion pin having a spherical impact head and an upper side and an underside, said underside facing a mouth of the conduit and having a recess which serves to deflect the main inflow in a clockwise direction, and said upper side forming an impact surface for oblique injection into the combustion space;
   a glow plug situated in an upper half of the combustion space, in a downward current of the main inflow of the fuel injection nozzle, wherein
   the conduit is arranged eccentrically in the insert neck; and
   the impact head of the insertion pin is inserted eccentrically in the combustion space such that a longitudinal axis of the insert extends between a longitudinal axis of the conduit and a center of the spherical impact head.

2. Internal combustion engine according to claim 1, wherein the longitudinal axes of the insert and the conduit are offset relative to each other by about 0.25 to 1.25 mm.

3. Internal combustion engine according to claim 1, wherein a plane defined by the longitudinal axes of insert and conduit and a longitudinal axis of the insertion pin form a maximum angle of 110° or a minimum angle of 70°.

4. Internal combustion engine according to claim 1, wherein the recess of the impact head is of cup-shaped design and the rim of the recess has a bell mouth.

5. Internal combustion engine according to claim 4, wherein a longitudinal axis of the injection nozzle is arranged in a position rotated by a maximum of 20° in the anticlockwise direction or by a maximum of 50° in the clockwise direction relative to a plane defined by the longitudinal axes of the insert of the conduit.

6. Internal combustion engine according to claim 1, wherein a longitudinal axis of the injection nozzle lies in a plane defined by the longitudinal axes of the insert and the conduit.

7. Internal combustion engine according to claim 6 wherein, a longitudinal axis of the insertion pin lies transversely to a plane defined by the longitudinal axes of the insert and the conduit.

8. Internal combustion engine according to claim 1, wherein a longitudinal axis of the injection nozzle is arranged in a position rotated by a maximum of 20° in the anticlockwise direction or by a maximum of 50° in the clockwise direction relative to a plane defined by the longitudinal axes of the insert and the conduit.

9. Internal combustion engine according to claim 8, wherein a plane defined by the longitudinal axes of the insert and conduit, and a longitudinal axis of the insertion pin are arranged in a position rotated relative to a plane which is defined by the longitudinal axes of insert and glow plug.

10. Internal combustion engine arrangement according to claim 1, wherein a longitudinal axis of the glow plug lies in a plane which is defined by longitudinal axes of the insert and the conduit.

11. Internal combustion engine according to claim 10, wherein the longitudinal axes of the insert and the conduit are offset relative to each other by about 0.25 to 1.25 mm.

12. Internal combustion engine according to claim 10, wherein a longitudinal axis of the injection nozzle is arranged in a position rotated by a maximum of 20° in the anticlockwise direction or by a maximum of 50° in the clockwise direction relative to a plane defined by the longitudinal axes of the insert and the conduit.

13. Internal combustion engine according to claim 10, wherein a plane defined by the longitudinal axes of insert and conduit and a longitudinal axis of the insertion pin form a maximum angle of 110° or a minimum angle of 70°.

14. Internal combustion engine according to claim 10, wherein a longitudinal axis of the injection nozzle lies in a plane defined by the longitudinal axes of the insert and the conduit.

15. Internal combustion engine according to claim 14 wherein, a longitudinal axis of the insertion pin lies transversely to a plane defined by the longitudinal axes of the insert and the conduit.

16. Internal combustion engine according to claim 15, wherein a plane defined by the longitudinal axes of insert and conduit and the longitudinal axis of the insertion pin form a maximum angle of 110° or a minimum angle of 70°.

17. Internal combustion engine according to claim 10 wherein, a longitudinal axis of the insertion pin lies transversely to a plane defined by the longitudinal axes of the insert and the conduit.

18. Internal combustion engine according to claim 17, wherein a plane defined by the longitudinal axes of insert and conduit and the longitudinal axis of the insertion pin form a maximum angle of 110° or a minimum angle of 70°.

19. Internal combustion engine according to claim 17, wherein a longitudinal axis of the injection nozzle is arranged in a position rotated by a maximum of 20° in the anticlockwise direction or by a maximum of 50° in the clockwise direction relative to a plane defined by the longitudinal axes of the insert and the conduit.

20. Internal combustion engine according to claim 19, wherein a plane defined by the longitudinal axes of the insert and conduit, and a longitudinal axis of the insertion pin are arranged in a position rotated relative to a plane which is defined by the longitudinal axes of insert and glow plug.

* * * * *